(12) United States Patent
Taipale et al.

(10) Patent No.: US 7,486,671 B2
(45) Date of Patent: Feb. 3, 2009

(54) DATA TRANSMISSION IN COMMUNICATION SYSTEM

(75) Inventors: Pekka Taipale, Espoo (FI); Jouni Borgman, Vantaa (FI)

(73) Assignee: Nokia Corporation, Epsoo (FI)

(*) Notice: Subject to any disclaimer, the term of this patent is extended or adjusted under 35 U.S.C. 154(b) by 738 days.

(21) Appl. No.: 10/923,506

(22) Filed: Aug. 23, 2004

(65) Prior Publication Data

US 2005/0281256 A1    Dec. 22, 2005

(30) Foreign Application Priority Data

Jun. 21, 2004   (FI)   .................................. 20045234

(51) Int. Cl.
*H04J 3/24* (2006.01)
(52) U.S. Cl. .................................. 370/389; 370/395.52
(58) Field of Classification Search ................ 370/389, 370/395.82, 395.52
See application file for complete search history.

(56) References Cited

U.S. PATENT DOCUMENTS

| | | | |
|---|---|---|---|
| 6,584,074 B1 * | 6/2003 | Vasamsetti et al. .......... 370/254 |
| 6,977,958 B1 * | 12/2005 | Hinman et al. .............. 375/211 |
| 7,032,012 B2 * | 4/2006 | Roh ........................... 709/220 |
| 7,136,385 B2 * | 11/2006 | Damon et al. .......... 370/395.31 |
| 7,274,730 B2 * | 9/2007 | Nakabayashi ............... 375/220 |
| 2002/0024946 A1 | 2/2002 | Min-Seop et al. |
| 2003/0219011 A1 | 11/2003 | Han |
| 2004/0139225 A1 * | 7/2004 | Takahashi ................... 709/238 |

* cited by examiner

*Primary Examiner*—Edan Orgad
*Assistant Examiner*—Jay P Patel
(74) *Attorney, Agent, or Firm*—Squire, Sanders & Dempsey L.L.P.

(57) ABSTRACT

A method for transmitting data in a communications system and a communication arrangement comprising a first network entity (10) and a second network entity (20), the arrangement being configured to transmit data in messages between the first network entity (10) and one or more third network entities (41, 42, 43) through the second network entity (20) by using the TCP/IP or UDP/IP transport protocol, wherein each message comprises a port number parameter indicating a TCP or UDP port number, respectively, and to use a modified port number parameter further indicating an identity of the third network entity (41, 42, 43), to/from which a message is transmitted, in the transmission of such a message between the first network entity (10) and the second network entity (20).

38 Claims, 1 Drawing Sheet

DATA TRANSMISSION IN COMMUNICATION SYSTEM

FIELD OF THE INVENTION

The present invention relates to data transmission in a communication system.

BACKGROUND OF THE INVENTION

DSL (Digital Subscriber Line) is a technology for bringing high-bandwidth information to e.g. homes and small businesses over ordinary copper telephone lines. Digital Subscriber Line is a technology that assumes digital data does not have to be converted into analogue form and back. Digital data is transmitted to a subscriber directly as digital data and this allows a much wider bandwidth to be used for transmitting the data than in traditional telephone systems. Several modulation technologies are used by various kinds of DSL (such as DSL, HDSL, SDSL, ADSL, RADSL and VDSL), and these are being standardized by the International Telecommunication Union (ITU).

In a typical DSL access system configuration, subscriber devices, such as telephones or IP terminals, are connected to a DSL line via a multiplexer (also known as Integrated Access Device, IAD), which comprises a DSL modem and provides access to the DSL system. The subscriber devices and the multiplexer, i.e. terminal equipment located at the premises owned or controlled by the customer using network services are referred to as Customer Premises Equipment or CPE. The DSL line is further connected to a DSL Access Multiplexer (DSLAM), which connects a number of DSL lines to other networks, such as the Internet, typically via a backbone network, which employs e.g. Internet Protocol (IP) or IP over ATM (Asynchronous Transfer Mode).

A DSL access system further comprises an Element Management System (EMS), which provides an interface for managing the various elements of the DSL access system network. With the management system, a network operator can communicate with the network elements. A function associated with the EMS is Customer Premises Equipment Management System (CPE-MS). The CPE-MS is typically used for various monitoring, diagnosis and configuration purposes and communicates with the customer premises equipment. The communication between the CPE-MS and CPE typically employs TCP/IP protocol (Transmission Control Protocol/Internet Protocol) or UDP/IP (User Datagram Protocol) transport protocol messages. The TCP/IP acts as the data transmission protocol in the Internet, the special advantage being its independence of different device or software architectures, which makes it the most generally used network protocol in the world, especially in local networks. In Internet-based networks, the IP protocol is the actual network protocol, which serves to route an addressed IP message from a source station to a destination station.

A problem associated with the transmission of management messages between the CPE-MS and the CPE using IP is that a dedicated management IP address should be reserved for each CPE, which is impractical as the number of CPEs may be high, even hundreds. For the same reason, also the use of dedicated point-to-point connections between the CPE-MS and the CPE for management purposes is impractical.

BRIEF DESCRIPTION OF THE INVENTION

An object of the present invention is thus to provide a method and an apparatus for implementing the method so as to overcome or at least to alleviate the above problem. The objects of the invention are achieved by a method, an arrangement and a system element, which are characterized by what is stated in independent claims 1, 11, 21 and 26. The preferred embodiments of the invention are disclosed in the dependent claims.

The invention is based on the idea of using a modified TCP/UDP port number parameter indicating, in addition to a TCP or UDP port number, an identity of the CPE, to/from which a message is transmitted, in the transmission of messages between the CPE-MS and the CPE.

An advantage of the method and arrangement of the invention is that a common IP address can be used for addressing several different CPEs, since the particular CPE, to/from which a message is transmitted, can be identified on the basis of the modified TCP/UDP port number parameter.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
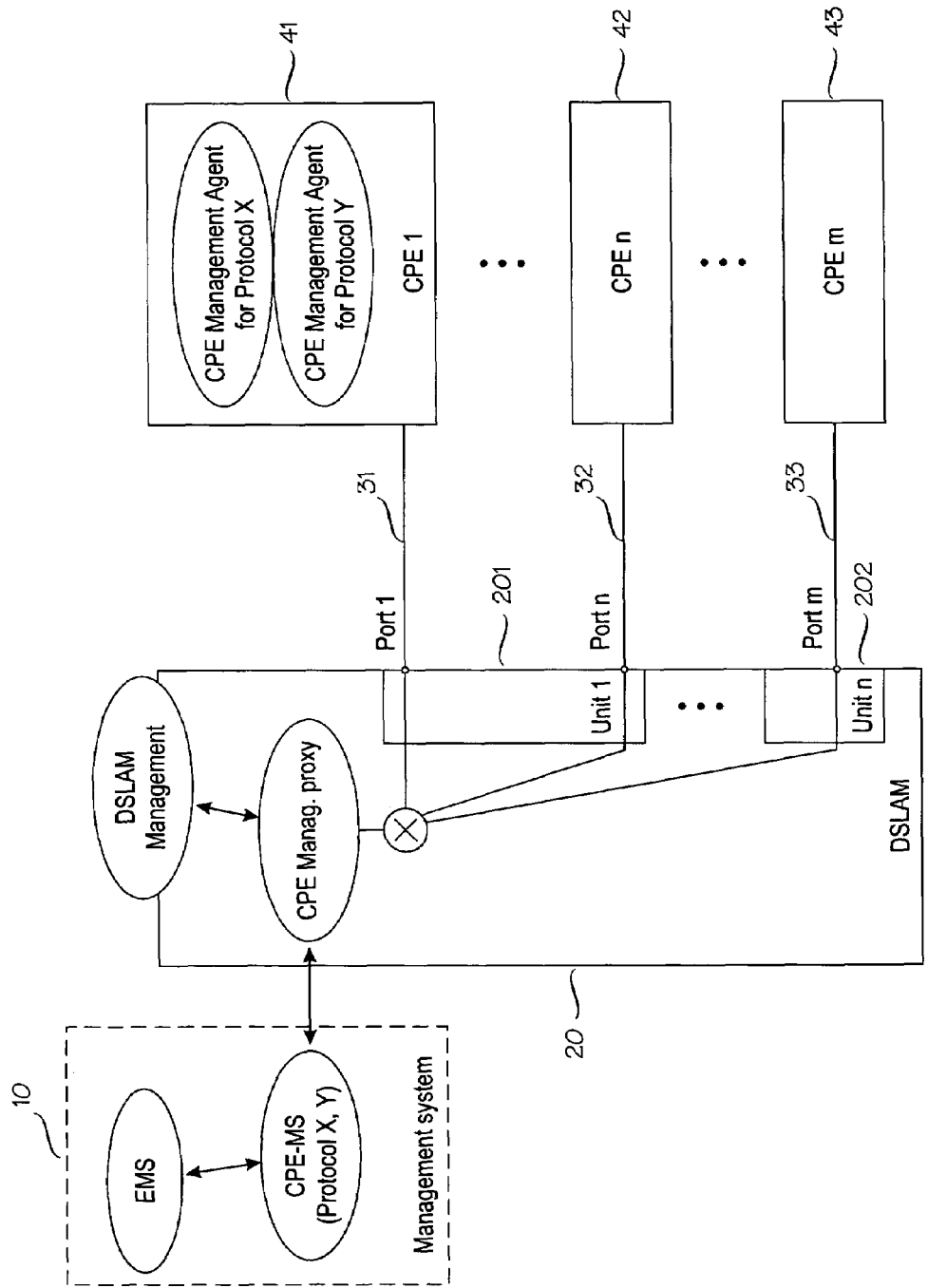
FIG. 1 is a block diagram of a communication system in which the invention can be used.

Even though the use of the invention will be described below in connection with a DSL access system, this does not restrict the application of the invention in other access systems. Furthermore, the application of the invention is not limited to the transmission of CPE management data.

FIG. 1 shows a simplified block diagram of a DSL access system. Customer premises equipment 41, 42 and 43 is connected to a digital subscriber line 31, 32 and 33. The DSL line is further connected to a DSL Access Multiplexer 20, which connects a number of DSL lines to other networks, such as the Internet, typically via a backbone network (not shown in the figure), which employs e.g. the Internet Protocol (IP) or IP over ATM (Asynchronous Transfer Mode). The DSL access system of FIG. 1 further comprises a management system 10 comprising an element management system, which provides an interface for managing the various elements of the DSL access system network, and an associated customer premises equipment management system (CPE-MS), which is used for various monitoring, diagnosis and configuration purposes and communicates with the customer premises equipment 41, 42 and 43. It should be noted that there might be other networks or network elements between the management system 10 and the DSL access multiplexer 20 even though such elements are not shown in the figure for the sake of clarity. In a similar fashion, the EMS and the CPE-MS could be located in different physical elements. The DSLAM 20 comprises a CPE Management Proxy, which handles the management messages transmitted between the CPE-MS and the CPE, and a DSLAM Management Agent, which provides a management interface for the DSLAM 20. Furthermore, the DSLAM 20 comprises a number of DSL interface units 201 and 202, which in turn comprise interface ports for the DSL lines 31, 32 and 33. The interface port thus refers to a physical port of the DSLAM 20 and should not be confused with a TCP or UDP port number, which is used in a TCP/IP or UDP/IP message. For example, CPE 1 is connected to port 1 of unit 1 of the DSLAM 20 via the DSL line 31. The customer premises equipment 41, 42 and 43 comprises one or more CPE management agents for different protocols (such as HTTP i.e. Hypertext Transfer Protocol, Telnet, FTP i.e. File Transfer Protocol and SNMP i.e. Simple Network Management Protocol). In FIG. 1, CPE 1 comprises two CPE management agents for protocols X and Y. The CPE management agent attends to the exchange of management information relating to a certain protocol or application with the CPE-MS.

The communication between the CPE-MS and the CPE preferably employs the TCP/IP protocol (Transmission Control Protocol/Internet Protocol) or UDP/IP (User Datagram Protocol) transport protocol messages. The TCP/IP protocol acts as the data transmission protocol in the Internet, the special advantage being its independence of different device or software architectures, which makes it the most generally used network protocol in the world, especially in local networks. In Internet-based networks, the IP protocol is the actual network protocol, which serves to route an addressed IP message from a source station to a destination station. A transport protocol, either the TCP or UDP, is run above the IP network protocol. The transport protocol attends to the transfer of data packets from a source port to a destination port. Each TCP/IP or UDP/IP message has a port number parameter indicating a TCP or UDP port number. This port number indicates the protocol at the application layer, which communicates using the messages. There are 65536 port numbers available for both the TCP and UDP. A few hundreds of them are reserved for known applications (specified by IANA, Internet Assigned Numbers Authority). For example, port number 80 is reserved for HTTP, port number 23 for Telnet, port number 20 for FTP data and port number 21 for FTP control.

The connection between the management system 10 and the DSLAM 20 may be an IP or IP over ATM connection, for example. The connection between the DSLAM 20 and the CPE 41, 42 or 43 is preferably an ATM Permanent Virtual Connection (PVC), which is employed for carrying the IP traffic. ATM is a general-purpose transfer mode, which combines the advantages of circuit-switched and packet-switched data transmission. ATM is based on cell-switched data transmission, the data to be transmitted being split into bits having a given length, i.e. cells. ATM is asynchronous in the sense that the recurrence of cells containing information from an individual user is not necessarily periodic.

According to the invention, a TCP/IP or UDP/IP message between the CPE-MS and the CPE 41, 42 or 43 is transmitted by using a modified port number parameter which, in addition to a TCP or UDP port number, indicates an identity of the CPE 41, 42 or 43, to/from which a message is transmitted, in the transmission of such a message between the CPE-MS and the DSLAM 20.

According to an embodiment of the invention, the use of a modified port number parameter is implemented such that when a message, such as a management message comprising management data, is to be transmitted from the CPE-MS to the CPE 41, 42 or 43, the identity of the recipient CPE 41, 42 or 43 is first included in the port number parameter of the message and the message with the thus modified port number parameter is then transmitted from the CPE-MS to the DSLAM 20. In the DSLAM 20, the CPE managing proxy then recognizes and removes the identity of the recipient CPE 41, 42 or 43 from the (modified) port number parameter of the message and forwards the message to the correct CPE 41, 42 or 43. As a result, when the CPE 41, 42 or 43 receives the message, the port number parameter of the message indicates only the correct TCP or UDP port number. Since the identity of the recipient CPE 41, 42 or 43 is indicated in the port number parameter and the DSLAM 20 can consequently forward the message to the correct CPE on the basis of this indication, a common IP address can be used for addressing different CPEs 41, 42 or 43. Preferably a common IP address is used for addressing all the CPEs connected to the same DSLAM 20 when sending management messages to them.

In a corresponding manner, when a message is to be transmitted from the CPE 41, 42 or 43 to the CPE-MS, it is first transmitted to the DSLAM 20 in a normal manner, i.e. using the IP address of the CPE-MS and a normal port number parameter indicating only the TCP or UDP port number. Then the CPE managing proxy in the DSLAM 20 includes the identity of the sender CPE 41, 42 or 43 in the port number parameter of the message and the message with the modified port number parameter is then transmitted from the DSLAM 20 to the CPE-MS. The CPE-MS can then recognize the sender CPE 41, 42 or 43, from which the message originates on the basis of the identity indication in the modified port number parameter even though the sender's IP address in such messages may be the same for several different CPEs. Preferably, the CPEs use the same generic IP address to receive and transmit management information even though the protocol indicator (TCP/UDP port number parameter) may vary.

According to an embodiment of the invention, the identity of the sender or recipient CPE 41, 42 or 43 comprises a physical address of the CPE. For example, the CPE in question can be identified with an interface unit (201 or 202) number and/or an interface port number of the DSLAM 20 to which the CPE is connected. The identity of the sender or recipient CPE 41, 42 or 43 is preferably included in the port number parameter of the message by re-calculating the port number parameter by using a suitable formula. For example the following formula can be used:

re-calculated port number parameter value=10000+
protocol number*3000+interface unit number*100+interface port number In the above formula, the re-calculated port number parameter value is the modified port number parameter and the protocol number is a predefined sequence number corresponding to the protocol indicated by the original TCP or UDP port number contained in the message. An appropriate range of port numbers for each management protocol (TCP or UDP port number) is preferably reserved and a predefined sequence number is given to each protocol in advance; for example, TCP/HTTP and UDP/SNMP=0, TCP/Telnet=1, TCP/FTP data=2, TCP/FTP control=3 etc. When using the exemplary formula above, this range is 3000 and the following allocations are obtained:

00000 ... 09999 Reserved (e.g. for DSLAM management)
10000 ... 12999 Proxy: TCP/HTTP, UDP/SNMP
13000 ... 15999 Proxy: TCP/Telnet,
16000 ... 18999 Proxy: TCP/FTP data,
19000 ... 20999 Proxy: TCP/FTP control,
... Etc.

The lower digits (e.g. 0000 ... 2999) can be used to address the physical port. The port number is added to the 'protocol base', e.g. 10000 or 13000. Port numbering in the DSLAM 20 in this example is such that the two higher digits address the interface unit slot (00 ... 29) and the two lower digits address the DSL interface port (00 ... 99). Consequently, the identity of the sender or recipient CPE 41, 42 or 43 of the message can be recognized by examining the value of these digits. The following list shows an example of port indexing. The first port number on each line is the interface unit and port number and the second number is the corresponding re-calculated (modified) port number that is used between the CPE-MS and the DSLAM 20:

Port 0101 CPE HTTP is at TCP 10101
Port 0102 CPE HTTP is at TCP 10102
...
Port 0201 CPE HTTP is at TCP 10201
...
Port 2148 CPE HTTP is at TCP 12148
Port 0101CPE Telnet is at TCP 13101
...
Port 2148 CPE Telnet is at TCP 15148
Port 0101 CPE FTP data is at TCP 16101
...
Port 2148 CPE FTP data is at TCP 18148
Port 0101 CPE FTP control at TCP 19101
...
Port 2148 CPE FTP control is at TCP 21148
Port 0101 CPE SNMP is at UDP 10101
Port 0102 CPE SNMP is at UDP 10102
...
Port 2148 CPE SNMP is at UDP-12148

As shown in the above example, the UDP and TCP port address spaces may overlap, but the port addresses of different TCP protocols (e.g. HTTP and Telnet) should not overlap.

The identity of the sender or recipient CPE 41, 42 or 43 can be removed from the modified port number parameter by replacing the modified port number parameter value with the corresponding TCP or UDP port number reserved for the protocol indicated by the modified port number parameter. For example, in the above indexing example the re-calculated port number parameter value 12148 indicates that the protocol is HTTP and the corresponding TCP or UDP port number would be 80.

It should be noted that other formulas could be used without deviating from the basic idea of the invention. The functionality of the invention is preferably implemented by means of suitable software in existing systems or devices or by using specific elements and devices. For example, the functionalities of the DSLAM 20 according to the present invention can be implemented by suitable software changes in existing DSLAM devices. It is also possible to implement the invention by means of specific integrated circuits, for example. This however has no relevance to the basic idea of the invention.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
    transmitting data in messages between a first system entity and at least one third system entity through a second system entity by using a transmission control protocol/internet protocol (TCP/IP) or a user datagram protocol/internet protocol (UDP/IP) transport protocol, wherein each message comprises a port number parameter indicating a transmission control protocol or user datagram protocol port number, respectively, and
    using a modified port number parameter further indicating an identity of the at least one third system entity, to which and from which a message is transmitted, in the transmission of such as message between the first system entity and the second system entity,
    wherein the use of a modified port number parameter comprises
        including, in the first system entity, the identity of the at least one third system entity to which a message is transmitted in the port number parameter of the message;
        transmitting the message to the second system entity; and
        removing, in the second system entity, the identity of the at least one third system entity from the port number parameter of the message before transmitting the message to the at least one third system entity.

2. The method of claim 1, wherein the use of a modified port number parameter comprises:
    including, in the second system entity, the identity of the at least one third system entity from which a message is transmitted in the port number parameter of the message; and
    transmitting the message to the first system entity.

3. The method of claim 1, wherein the identity of the at least one third system entity comprises a physical address of the at least one third system entity.

4. The method of claim 3, wherein the physical address of the at least one third system entity comprises one or both of an interface unit number and an interface port number of the second system entity to which the at least one third system entity is connected.

5. The method of claim 4, wherein the identity of the at least one third system entity is included in the port number parameter of the message by re-calculating the port number parameter according to the following formula:
    re-calculated port number parameter value=10000+protocol number*3000+interface unit number*100+interface port number, wherein
    protocol number=predefined protocol sequence number.

6. The method of claim 5, wherein the identity of the at least one third system entity is removed from the port number parameter of the message by replacing the re-calculated port number parameter value with a transmission control protocol or user datagram protocol port number corresponding to the protocol indicated by the re-calculated port number parameter value.

7. The method of claim 1, wherein the first system entity comprises a digital subscriber line (DSL) customer premises equipment management system, the second system entity comprises a digital subscriber line access multiplexer and the third system entity comprises a digital subscriber line customer premises equipment.

8. The method of claim 7, wherein the data transmitted in messages between the first system entity and the at least one third system entity through the second system entity comprises management data.

9. The method of claim 1, further comprising using a common internet protocol address for the transmission of data from the first system entity to at least two third system entities.

10. A system, comprising:
    a first network entity and a second network entity;
    wherein the system is configured to transmit data in messages between the first network entity and at least one third network entity through the second network entity by using a transmission control protocol/internet (TCP/IP) or a user datagram protocol/internet protocol (UDP/IP) transport protocol, wherein each message comprises a port number parameter indicating a transmission control protocol or user datagram protocol port number respectively; and
    wherein the system is further configured to use a modified port number parameter further indicating an identity of the at least one third network entity, to which and from which a message is transmitted, in the transmission of such a message between the first network entity and the second network entity, and wherein the first network entity is configured to include the identity of the at least one third network entity to which a message is transmitted in the port number parameter of the message when transmitting the message to the at least one third network entity through the second network entity, and the second network entity is configured to remove the identity of the at least one third network entity from the port number parameter of the message before forwarding the message to the at least one third network entity.

11. The system of claim 10, wherein the second network entity is configured to include the identity of the at least one third network entity from which a message is transmitted in the port number parameter of the message before forwarding the message to the first network entity.

12. The system of claim 10, wherein the identity of the at least one third network entity comprises a physical address of the at least one third network entity.

13. The system of claim 12, wherein the physical address of the at least one third network entity comprises one or both of an interface unit number and an interface port number of the second network entity to which the at least one third network entity is connected.

14. The system of claim 13, wherein the first and second network entity is configured to include the identity of the at least one third network entity in the port number parameter of the message by re-calculating the port number parameter according to the following formula:

re-calculated port number parameter value=10000+protocol number*3000+interface unit number*100+interface port number, wherein protocol number=predefined protocol sequence number.

15. The system of claim 14, wherein the first and second network entity is configured to remove the identity of the at least one third network entity from the port number parameter of the message by replacing the re-calculated port number parameter value with a transmission control protocol or user datagram protocol port number corresponding to the protocol indicated by the re-calculated port number parameter value.

16. The system of claim 10, wherein the first network entity comprises a digital subscriber line (DSL) customer premises equipment management system and the second network entity comprises a digital subscriber line access multiplexer.

17. The system of claim 16, wherein the data transmitted in messages between the first network entity and the at least one third network entity through the second network entity comprises management data.

18. The system of claim 10, wherein the arrangement is configured to use a common internet protocol address for the transmission of data from the first network entity to at least two third network entities.

19. An apparatus comprising:
a transmitter configured to transmit data in messages to at least one third system element through a second system element by using a transmission control protocol/internet protocol (TCP/IP) or a user datagram protocol/internet protocol (UDP/IP) transport protocol, wherein each message comprises a port number parameter indicating a transmission control protocol or user datagram protocol port number, respectively, wherein the apparatus is configured to include an identity of the at least one third system element, to which a message is transmitted, in the port number parameter of the message when transmitting the message to the at least one third system element through the second system element, wherein the identity of the at least one third system element comprises a physical address of the at least one third system element, wherein the physical address of the at least one third system element comprises one or both of an interface unit number and an interface port number of the second system element to which the at least one third system element is connected, and wherein the apparatus is configured to include the identity of the at least one third system element in the port number parameter of the message by re-calculating the port number parameter according to the following formula re-calculated port number parameter value=10000+protocol number*3000+interface unit number*100+interface port number, wherein protocol number=predefined protocol sequence number.

20. The apparatus of claim 19, the apparatus comprising a digital subscriber line customer premises equipment management system.

21. An apparatus comprising:
a forwarder configured to forward messages between a first system element and at least one third system element, wherein the messages are a transmission control protocol/internet protocol (TCP/IP) or a user datagram protocol/internet protocol (UDP/IP) transport protocol messages and wherein each message comprises a port number parameter indicating a transmission control protocol or user datagram protocol port number, respectively;

an inserting unit configured to include an identity of at least one third system element, from which a message is transmitted, in a port number parameter of the message before forwarding the message to a first system element; and a remover configured to remove the identity of the at least one third system element, to which a message is transmitted, from the port number parameter of the message before forwarding the message to the at least one third system element.

22. The apparatus claim 21, wherein the identity of the at least one third system element comprises a physical address of the at least one third system element.

23. The apparatus of claim 22, wherein the physical address of the at least one third system element comprises one or both of an interface unit number and an interface port number of a second system element to which the third system element is connected.

24. The apparatus of claim 23, the apparatus being configured to include the identity of the at least one third system element in the port number parameter of the message by re-calculating the port number parameter according to the following formula:

re-calculated port number parameter value=10000+protocol number*3000+interface unit number*100+interface port number, wherein protocol number=predefined protocol sequence number.

25. The apparatus of claim 24, the apparatus being configured to remove the identity of the at least one third system element from the port number parameter of the message by replacing the re-calculated port number parameter value with a transmission control protocol or user datagram protocol port number corresponding to the protocol indicated by the re-calculated port number parameter value.

26. The apparatus of claim 21, the apparatus further comprising a digital subscriber line access multiplexer.

27. A method comprising:
transmitting data in messages from a first system element to at least one third system element through a second system element by using a transmission control protocol/internet protocol (TCP/IP) or a user datagram protocol/internet protocol (UDP/IP) transport protocol, wherein each message comprises a port number parameter indicating a transmission control protocol or user datagram protocol port number, respectively, and
including in the first system element an identity of the at least one third system element, to which a message is transmitted, in the port number parameter of the message when transmitting the message to the at least one third system element through the second system element,
wherein the identity of the at least one third system entity comprises a physical address of the at least one third system entity,
wherein the physical address of the at least one third system entity comprises one or both of an interface unit number and an interface port number of the second system entity to which the at least one third system entity is connected, and
wherein the identity of the at least one third system entity is included in the port number parameter of the message by re-calculating the port number parameter according to the following formula
re-calculated port number parameter value=10000+protocol number*3000+interface unit number*100+interface port number, wherein protocol number=predefined protocol sequence number.

28. The method of claim 27, wherein the first system entity comprises a digital subscriber line (DSL) customer premises equipment management system.

29. The method of claim 27, wherein, the data transmitted comprises management data.

30. The method of claim 27, further comprising using a common internet protocol address for the transmission of the transmission of data from the first system entity to at least two third system entities.

31. A method comprising:
forwarding by a second system element messages between a first system element and at least one third system element, wherein the messages are a transmission control protocol/internet protocol (TCP/IP) or a user datagram protocol/internet protocol (UDP/IP) transport protocol messages and wherein each message comprises a port number parameter indicating a transmission control protocol or user datagram protocol port number, respectively;
including in the second system element an identity of at least one third system element, from which a message is transmitted, in a port number parameter of the message before forwarding the message to a first system element; and
removing in the second system element the identity of the at least one third system element, to which a message is transmitted, from the port number parameter of the message before forwarding the message to the at least one third system element.

32. The method of claim 31, wherein the identity of the at least one third system entity comprises a physical address of the at least one third system entity.

33. The method of claim 32, wherein the physical address of the at least one third system entity comprises one or both of an interface unit number and an interface port number of the second system entity to which the at least one third system entity is connected.

34. The method of claim 33, wherein the identity of the at least one third system entity is included in the port number parameter of the message by re-calculating the port number parameter according to the following formula:
re-calculated port number parameter value=10000+protocol number*3000+interface unit number*100+interface port number, wherein protocol number=predefined protocol sequence number.

35. The method of claim 34, wherein the identity of the at least one third system entity is removed from the port number parameter of the message by replacing the re-calculated port number parameter value with a transmission control protocol or user datagram protocol port number corresponding to the protocol indicated by the recalculated port number parameter value.

36. The method of claim 31, wherein the second system entity comprises a digital subscriber line access multiplexer.

37. The method of claim 31, wherein the data transmitted comprises management data.

38. A computer program, embodied on a computer-readable medium, the computer program controlling a processor to perform a method, the method comprising:
forwarding by a second system element messages between a first system element and at least one third system element, wherein the messages are a transmission control protocol/internet protocol (TCP/IP) or a user datagram protocol/internet protocol (UDP/IP) transport protocol messages and wherein each message comprises a port number parameter indicating a transmission control protocol or user datagram protocol port number, respectively;
including in the second system element an identity of at least one third system element, from which a message is transmitted, in a port number parameter of the message before forwarding the message to a first system element; and
removing in the second system element the identity of the at least one third system element, to which a message is transmitted, from the port number parameter of the message before forwarding the message to the at least one third system element.

* * * * *